United States Patent Office.

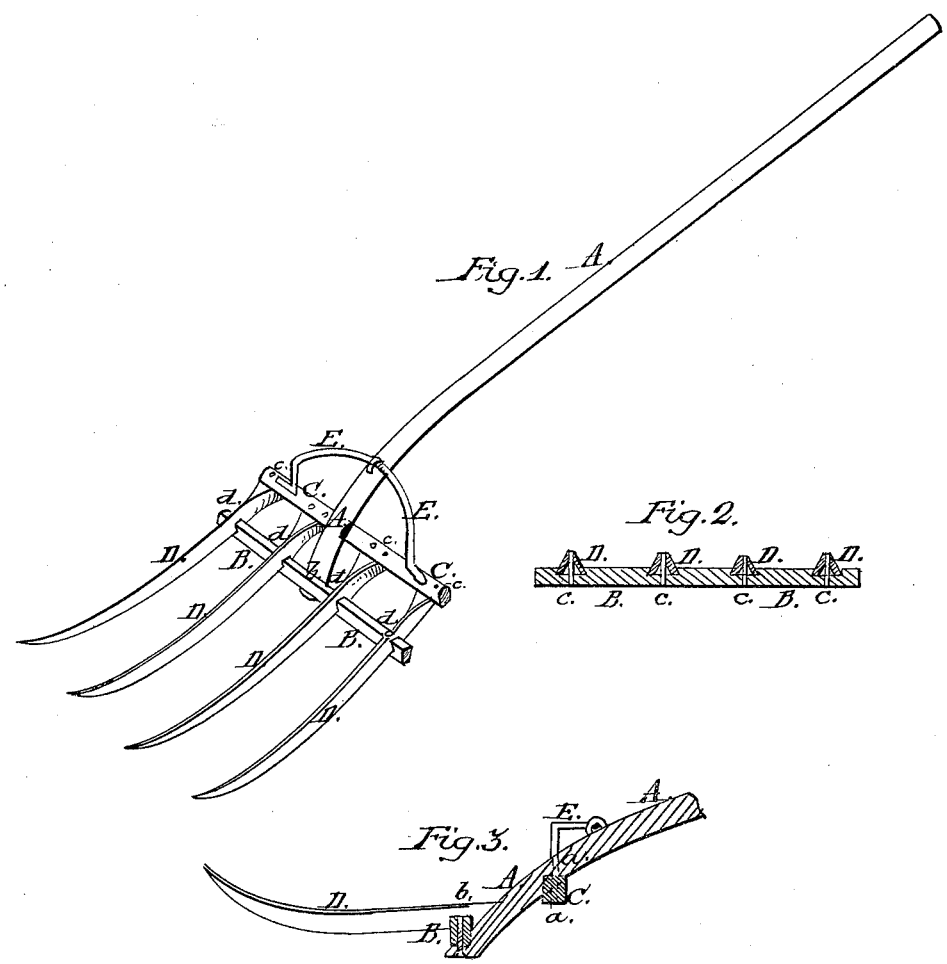

L. D. PITCHER, OF PITCHERVILLE, ILLINOIS.

*Letters Patent No. 90,463, dated May 25, 1869.*

---

IMPROVEMENT IN HAY AND MANURE-FORKS.

---

The Schedule referred to in these Letters Patent and making part of the same.

---

*To all whom it may concern:*

Be it known that I, L. D. PITCHER, of Pitcherville, in the county of Jo Daviess, and State of Illinois, have invented a new and improved Hay and Manure-Fork; and I do hereby declare that the following is a full, clear, and exact description thereof, which will enable others skilled in the art to make and use the same, reference being had to the accompanying drawing, forming part of this specification, in which—

Figure 1 represents a perspective view of my improved hay and manure-fork.

Figure 2 is a vertical transverse section of the same.

Figure 3 is a detail longitudinal section of the same.

Similar letters of reference indicate corresponding parts.

This invention relates to a new manner of connecting the tines to the handle of a manure and hay-fork, for the purpose of producing a substantial fastening, so that the fork will be adapted for loading and transporting loose hay and straw as securely as if the same were in bundles.

The invention consists chiefly in the application of a cross-bar with dovetailed mortises, adapted to receive the inverted V-shaped sheet-metal tines.

The invention consists also in a new manner of attaching the cross-head to the flattened back ends of the tines, by means of screws, and by the ends of the bow, all as hereinafter more fully described.

A, in the drawing, represents the handle of my improved fork.

The front or lower end of the handle is bent down, and fitted under a cross-bar, B, and over a cross-head, C, it being notched on the upper side, to receive the cross-bar, as shown.

The tines D D, of which two, four, six, or more can be used, are stamped or formed of sheet-metal, so as to have a cross-section similar to an inverted letter V, to be hollow on the under side, and ridge-shaped on top, as shown.

The back ends of the tines are flattened, and are fastened to the under side of the cross-head by means of screws $c\ c$, two such screws being used for each tine, as shown, with the exception of the two outer tines, which have but one screw each, the ends of the bail E being the additional fastening.

The bail E is fastened to the handle in suitable manner, and has its ends extend through the cross-head and through the tines, so that such ends will serve at once to fasten the tines and the bail.

The cross-bar B has its upper edge provided with dovetail mortises, narrower on top, to receive the tines, as shown, said tines being inserted endwise into these mortises. Screws, $d\ d$, serve to fasten the tines to the cross-bar.

This fork is at once strong and durable, and will not be apt to get out of repair.

If a tine should become loose by wear, it can be readily tightened by means of the screws $d$.

The sheet-metal tines are cheaper than those formerly in use, and fully strong enough for ordinary wear.

Having thus described my invention,

What I claim as new, and desire to secure by Letters Patent, is—

A hay and manure-fork, consisting of the sheet-metal tines, fitted over the cross-bar B and under the head C, and of the handle A, fitted over the head C and under the bars B, substantially as herein shown and described, all arranged as specified.

L. D. PITCHER.

Witnesses:
GEORGE JUSTUS,
H. M. JUSTUS.